(No Model.)

J. M. WHITE.
WASHER.

No. 554,431. Patented Feb. 11, 1896.

Witnesses:
A. R. Appleman Jr
R. Caldwell

Inventor:
Jno. M. White
G. F. Appleman
atty

UNITED STATES PATENT OFFICE.

JOHN M. WHITE, OF CHICAGO, ILLINOIS.

WASHER.

SPECIFICATION forming part of Letters Patent No. 554,431, dated February 11, 1896.

Application filed April 1, 1895. Serial No. 544,076. (No model.)

*To all whom it may concern:*

Be it known that I, JOHN M. WHITE, a citizen of the United States of America, residing at Chicago, in the county of Cook and State of Illinois, have invented certain new and useful Improvements in Washers, of which the following is a specification, reference being had to the accompanying drawings.

This invention relates to washers, and has for its object the provision of means for readily applying and removing the same from a shaft or the like without removing the shaft or otherwise disturbing the same.

With these objects in view the invention consists in the novel details of construction, arrangement, and combination of parts to be hereinafter more fully set forth and specifically claimed.

In describing the invention in detail reference is had to the accompanying drawings, forming part of this specification, wherein like numerals denote corresponding parts in the several views, in which—

Figure 1:
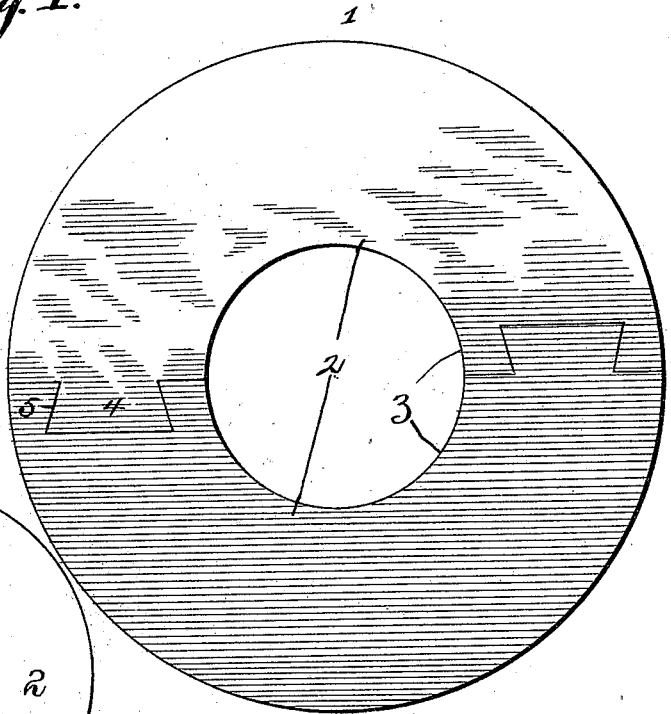
Figure 5:
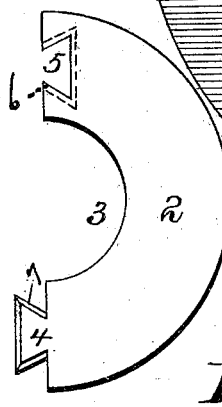
Figure 3:
Figure 4:
Figure 2:
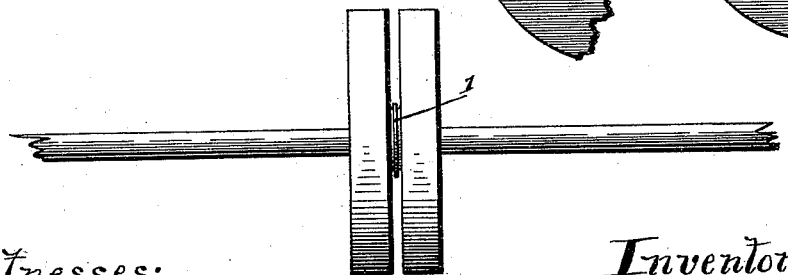

Figure 1 is a view in side elevation of my improved washer. Fig. 2 is a view in elevation of a shaft and pulleys, showing one application of same. Fig. 3 is a view in detail showing a recess, the walls of which are tapered. Fig. 4 is a similar view showing the tenon with a taper to conform to the taper of the recess. Fig. 5 is a view in side elevation of one section of the washer.

In the drawings, 1 denotes a washer made in semicircular sections 2 with a semicircular recess 3 in each. Each half of the washer is provided with a tenon 4 and recess 5, respectively, connecting in the opposite ends of the washer, it being understood also that the connecting tenons and recesses may be multiplied, or that one half may be provided with flared tenons connecting with recesses in the opposite half of the washer. The edges of the recess and tenon of each section are oppositely beveled, as at 6 and 7, to effect the oppositely-locking function above stated.

The washer is shown in Fig. 2 applied between two pulleys, and, as will be seen, by reason of the intercocking parts the washer can be secured in place by simply separating the pulleys and inserting the parts. The advantages of this arrangement will be appreciated when a washer is to be applied on a shaft when the hangers, collars, &c., would interfere with the application of the washer in common use, and it will be seen also that the numerous advantages result from the use of this form in the construction of engines and machinery in which they are to a greater or less extent employed, as they can be easily removed and renewed when worn.

This washer is designed also for use on friction-clutches, as it will enable increased service and obviate frequent renewing of the clutches. It can be used with equal advantage on stay rods or bolts, and is especially useful in cases where a nut cannot be removed because of battered threads, or where a great deal of time would be consumed in entirely removing the nut.

The advantages will, it is thought, be apparent from the foregoing description, and it will be particularly noted that changes may be made in the details of constructions, and yet the spirit of my invention will not be departed from.

Having fully explained my invention, what I claim as new, and desire to obtain by Letters Patent, is—

A washer consisting of semicircular sections, each section having formed on its ends a recess and tenon respectively, the edges of said recesses and tenons being oppositely beveled, as and for the purpose described.

In testimony whereof I affix my signature in presence of two witnesses.

JOHN M. WHITE.

Witnesses:
  A. W. PEASLEY,
  M. F. WHITE.